US009778342B2

(12) United States Patent
Amizur

(10) Patent No.: US 9,778,342 B2
(45) Date of Patent: Oct. 3, 2017

(54) TRANSMITTER PRECODING FOR OPTIMIZING POSITIONING PERFORMANCE

(71) Applicant: Intel Corporation, Santa Clara, CA (US)

(72) Inventor: Yuval Amizur, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/005,968

(22) Filed: Jan. 25, 2016

(65) Prior Publication Data

US 2016/0291118 A1 Oct. 6, 2016

Related U.S. Application Data

(63) Continuation of application No. 13/977,571, filed as application No. PCT/US2011/067600 on Dec. 28, 2011, now Pat. No. 9,246,723.

(51) Int. Cl.
*H04B 7/06* (2006.01)
*G01S 5/02* (2010.01)
*G01S 11/02* (2010.01)
*H04L 27/00* (2006.01)
*H04B 7/0456* (2017.01)
*H04W 4/02* (2009.01)

(52) U.S. Cl.
CPC .......... *G01S 5/0226* (2013.01); *G01S 5/0215* (2013.01); *G01S 11/02* (2013.01); *H04B 7/0456* (2013.01); *H04B 7/06* (2013.01); *H04L 27/0014* (2013.01); *H04W 4/02* (2013.01)

(58) Field of Classification Search
CPC . H04L 27/0014; G01S 5/0215; G01S 5/0226; G01S 11/02; H04B 7/0456; H04B 7/06; H04W 4/02
See application file for complete search history.

(56) References Cited

U.S. PATENT DOCUMENTS

| | | | | |
|---|---|---|---|---|
| 2009/0122715 A1* | 5/2009 | Lakkis | ................. | H04B 7/0617 370/252 |
| 2010/0271263 A1* | 10/2010 | Moshfeghi | ............ | G01S 5/0263 342/378 |
| 2011/0019567 A1* | 1/2011 | Jiao | ........................ | G01S 5/0273 370/252 |

\* cited by examiner

*Primary Examiner* — Ted Wang
(74) *Attorney, Agent, or Firm* — Eversheds Sutherland (US) LLP

(57) ABSTRACT

Described herein are techniques related to transmitter precoding for optimizing positioning performance. The techniques are directed to transmit signals with relatively higher transmission power, in a direction along the line of sight between the transmitter and the receiver, than signals transmitted in other directions. The techniques render the first signal arriving at the receiver, as it travels along the line of sight between the transmitter and the receiver, to have stronger signal strength than the signal strengths of other signals that travel through non-LoS paths to reach the receiver.

19 Claims, 9 Drawing Sheets

TRANSMITTER PRECODING FOR OPTIMIZING POSITIONING PERFORMANCE

BACKGROUND

In the context of wireless communications, when measuring time of arrival (ToA) in multipath environment, a receiver typically receives multiple components each of which representing a distinct path. The shortest path between the transmitter and the receiver is often the path along a line of sight (LoS). The first signal that arrives at the receiver is referred to as the LoS component. The time it takes for the LoS component to travel from the transmitter to the receiver is the time used for calculating the distance between the transmitter and the receiver. However, as the signal strength of the LoS component tends to be weak compared to the signal strength of non-LoS components, it is difficult to identify and measure the time of the LoS component. For example, as shown in FIG. 3, the LoS component may be barely identifiable or not even identifiable due to its weak signal strength compared to the noise while the non-LoS components are stronger in signal strength and hence relatively more identifiable. This would result in a non-LoS component being mistakenly identified as the first component, and hence the "LoS component", and consequently lead to inaccuracy in the measurement of ToA and calculation of distance.

In some cases, there may be one or more non-LoS components that arrive at the receiver very close in time to the arrival of the LoS component. This also makes it difficult to identify and measure the ToA of the LoS component.

BRIEF DESCRIPTION OF THE DRAWINGS

The Detailed Description references the accompanying figures. In the figures, the left-most digit(s) of a reference number identify the figure in which the reference number first appears. The same numbers are used throughout the drawings to reference like features and components.

DETAILED DESCRIPTION

Figure 1:
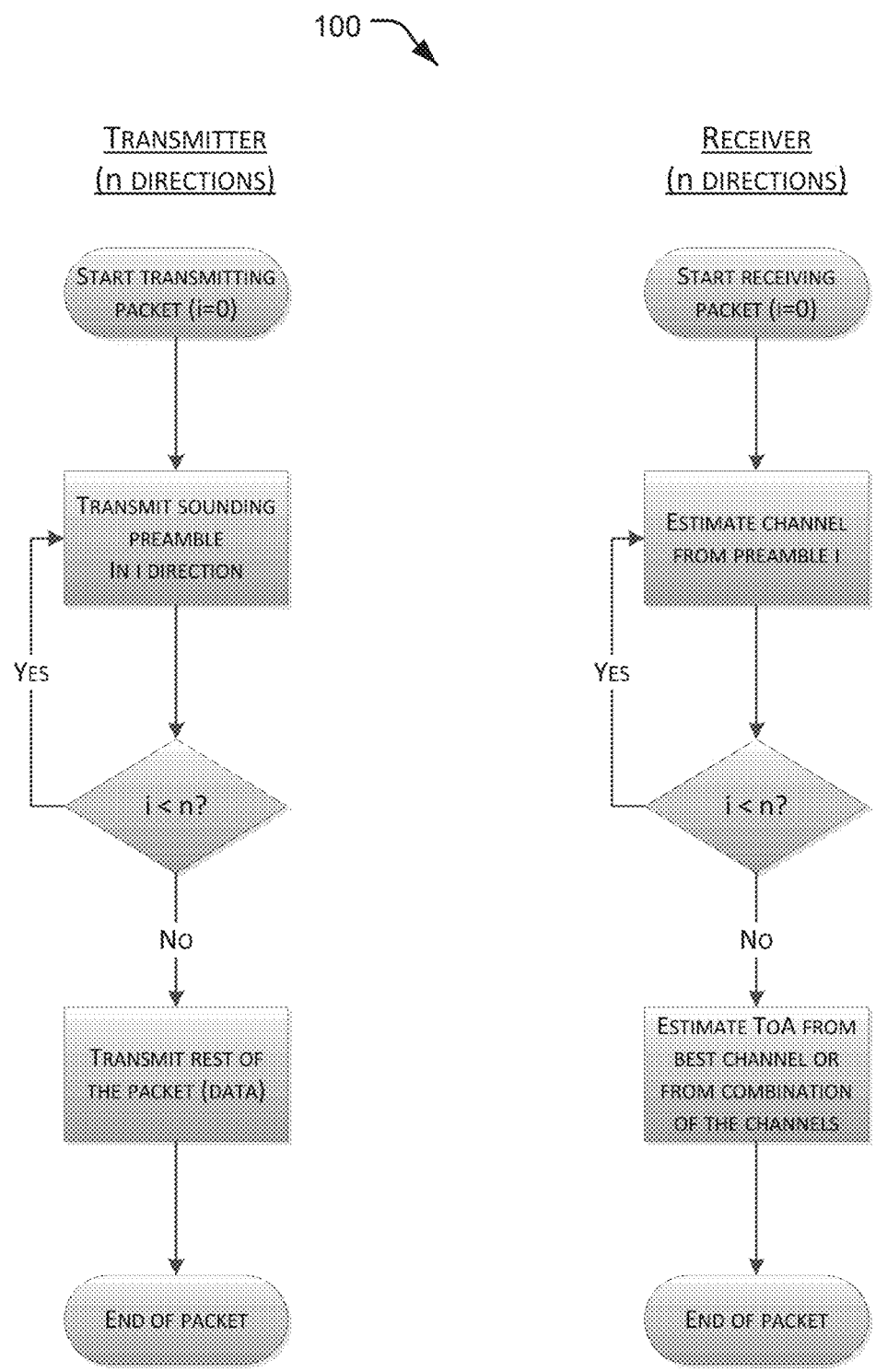
FIG. 1 is a flow chart illustrating an example scheme of transmitter precoding for optimizing positioning performance in accordance with the present disclosure.

Disclosed herein are techniques, architectures, platforms, devices, framework and methods that implement transmitter precoding for optimizing positioning performance. Signals are transmitted from the different transmitter antennas with appropriate signal strengths and phases such that the time of arrival (ToA), and hence the distance between the transmitter and a receiver, may be estimated accurately.

One approach of the techniques, an open-loop approach, leverages precoding techniques in that the transmitter transmits a plurality of preambles in a plurality of directions with different precoding for each transmission. A preamble may be a transmitted known signal used to estimate a channel, where the preamble is transmitted by a transmitter. One or more of the transmitted preambles might be transmitted along a line of sight between the transmitter and the receiver, and hence reach the receiver with stronger LoS component, while one or more other transmitted preambles, which where transmitted in other directions, reach the receiver with weaker LoS component. The receiver analyzes the channels from the preambles and estimates the ToA of the LoS component. It is assumed that at least one of the preambles is good enough to result in good ToA. measurement of the LoS component. The receiver may choose the best estimation of the earliest ToA to determine the LoS distance between the receiver and the transmitter.

Another approach of the techniques, a closed-loop approach, calculates the best precoding scheme, on the transmitter end, that would allow the receiver to estimate the ToA of the LoS component optimally. The transmitter transmits one preamble based on this calculated precoding scheme. Under this approach, the transmitter is aware of the channel between it and the receiver probably because of receiving feedback from the receiver from a previous transaction. This channel can be extracted from preambles without precoding.

The term "multipath" as used in the present disclosure refers to the propagation phenomenon that results in radio signals reaching a receiver's antenna by two or more paths. Causes of multipath phenomenon include atmospheric ducting, ionospheric reflection and refraction, and reflection from water bodies and terrestrial objects such as mountains and buildings, etc. In an indoor environment, the causes of multipath phenomenon can include any object such as walls, furniture, etc.

The term "channel" as used in the present disclosure refers to the impulse response of the transmission medium in the time domain between a transmitter and a receiver for each antenna pair. Due to the multipath phenomenon, each impulse from the transmitter is seen as multiple impulses in the receiver at different times, strengths and phases.

The term "preamble" as used in the present disclosure refers to a known signal transmitted by a transmitter in order to estimate the channel. The receiver can analyze the preamble and calculate the channel based on the preamble.

The term "component" as used in the present disclosure refers to a part of a signal, e.g., a preamble, received from a certain path. Due to the multipath phenomenon, a component received at the receiver may be a multipath component of a preamble transmitted by the transmitter.

The term "LoS component" as used in the present disclosure refers to the part of a signal that arrives at the receiver through a direct path, or the line-of-sight path, between the transmitter and the receiver.

Example Schemes

FIG. 1 illustrates an example scheme 100 that implements the techniques of transmitter precoding of the present disclosure. On the transmitter side, a number of preambles (e.g., n preambles) of a data packet, with or without data, are transmitted at different times in a corresponding number of different directions (e.g., n directions). After transmitting the n preambles, the transmitter transmits the rest of the data packet, with or without payload.

On the receiver side, some or all of the n preambles may he received. Accordingly, the receiver may receive up to n number of then transmitted n preambles. In some cases, one or more of the received preambles might reach the receiver directly. In some other cases, there might be one or more obstacles, e.g., a wall, between the transmitter and the receiver. The LoS component of one or more of the received preambles, such as a preamble that was transmitted in the LoS direction, will arrive with stronger signal strength than non-LoS components. In some cases, one or more of the other received preambles may reach the receiver after reflection or refraction. Each of those preambles reaching the receiver may arrive at the receiver as one or more multipath components, especially in the case of components having been reflected and/or refracted before reaching the receiver. The receiver may estimate a respective channel of each of the received preamble of all multipath components, including the time, magnitude and/or phase of each component, of the received preambles, and estimate a respective ToA with respect to one or more of the estimated channels.

The channel structure may depend on the environment and on the signal transmission precoding, where beam forming is only one example of precoding. In the case when a preamble is transmitted approximately in the direction of the LoS, the signal strength of such LoS direction preamble may be stronger than the signal strength of preambles transmitted in non-LoS directions. This allows the identification of LoS to be easier.

The receiver estimates a respective ToA of the LoS component, for each received preamble and calculates a score for each estimation. The ToA with the highest score is chosen as the best estimated ToA. The score may be based on one or more factors such as, for example, timing and/or the signal strength of the LoS component. For example, the earliest ToA may contribute to the respective score being the highest score. Alternatively or additionally, the LoS component with the strongest signal strength may contribute to the respective score being the highest score. Thus, the receiver may identify the chosen ToA from among the estimated ToAs of the received components of the plurality of signals as the best estimated ToA. The LoS distance between the receiver and the transmitter may be calculated based on the best estimated of ToA of the LoS component.

The number n, or the number of the preambles transmitted on the transmitter and resultantly received on the receiver side, may affect the accuracy of the estimation as described above. Generally, the higher the number n, the better the accuracy will be in channel estimation and ToA estimation.

Figure 2:
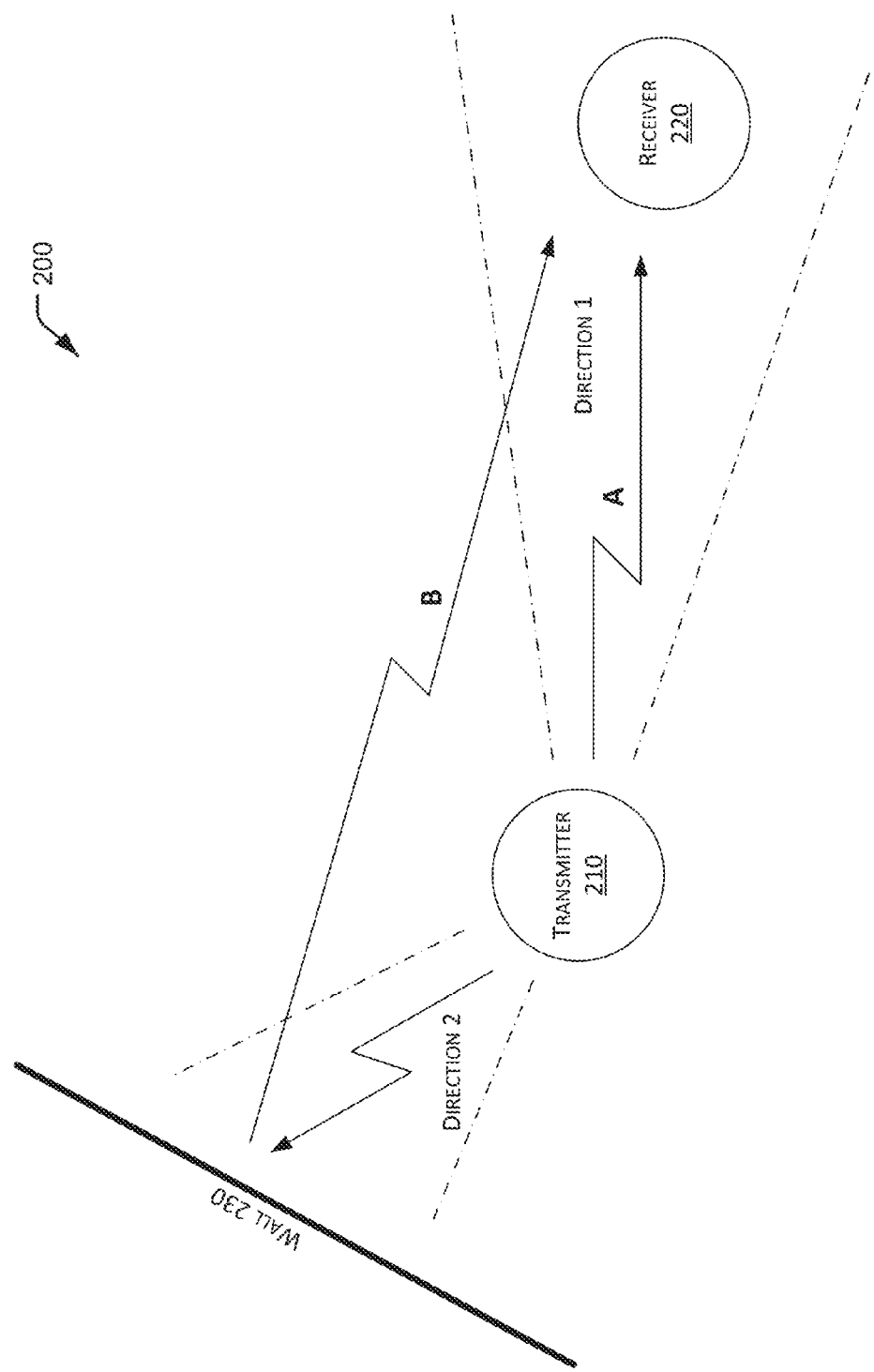
FIG. 2 is a diagram illustrating an example scenario of wireless signal transmission and reception in a multipath environment.

FIG. 2 illustrates an example scenario of wireless signal transmission and reception in a multipath environment 200. As shown in FIG. 2, a transmitter 210 transmits a preamble A in general direction 1 and a preamble B in general direction 2. The preamble B is reflected by a wall 230 to travel in a different direction towards a receiver 220. Both preamble A and preamble B eventually reach receiver 220. However, receiver 220 receives the signal through LoS path before the signal through non-LoS path as the through from LoS path traveled in general direction 1, which is approximately along the LoS between transmitter 210 and receiver 220, while the signal through path non-LoS took a longer path to reach receiver 220. Both the LoS component and the indirect/non-LoS component exist with respect to preamble A and preamble R In the case of preamble A, signal strength of the LoS component at the receiver 220 will be much stronger than that of the indirect/non-LoS component. In the case of preamble B, The LoS component will be much weaker comparing to the non-LoS component. This is because even though the preambles are transmitted in certain directions, some of the energy is still transmitted to other directions. The ability to control energy concentration toward a certain direction depends on the number of transmitter antennas and the geometrical ordering of the antennas.

Figure 3:
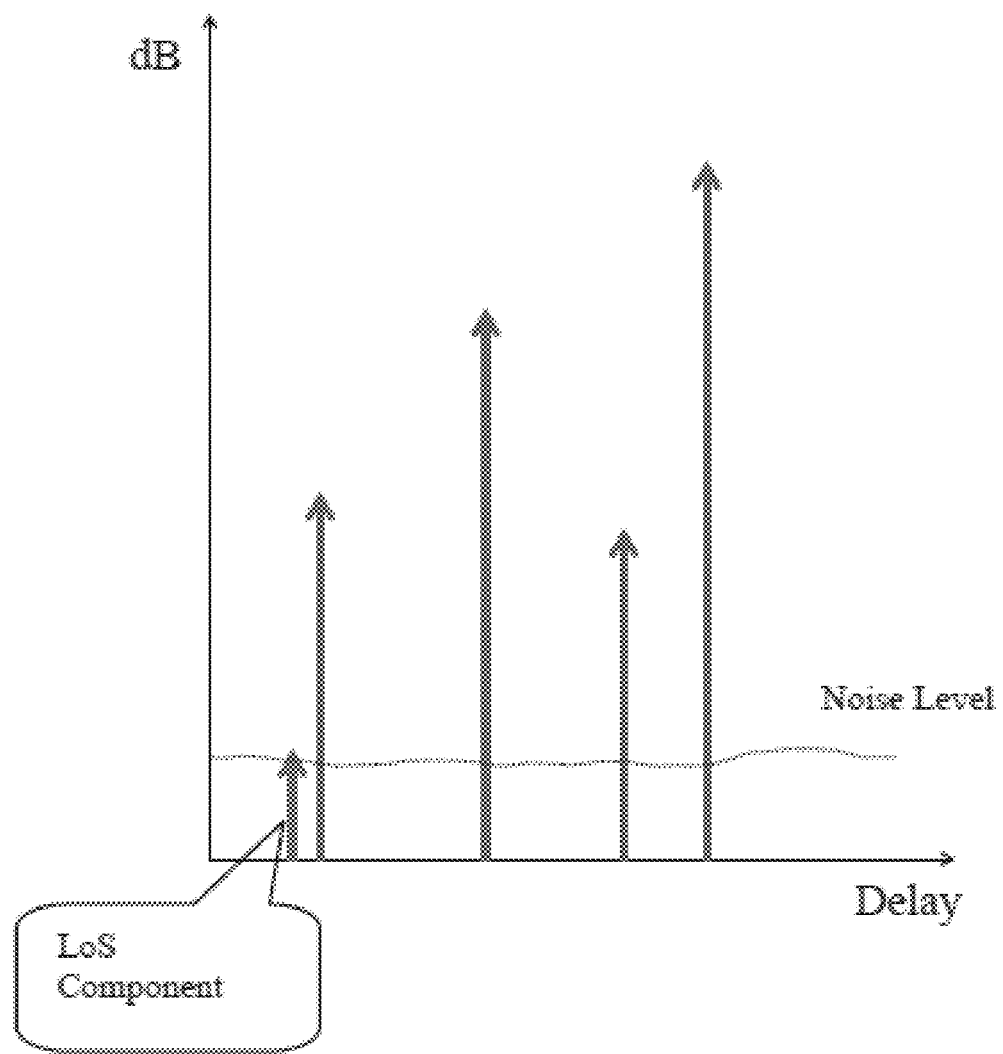
FIG. 3 is a diagram illustrating an example scenario of signal strengths of various channels at a receiver without transmitter precoding.

FIG. 3 illustrates an example scenario of signal strengths of various channels at a receiver without transmitter precoding. As shown in FIG. 3, the LoS component may be barely identifiable or not even identifiable due to its weak signal strength compared to the noise while the non-LoS components are stronger in signal strength and hence relatively more identifiable. As can be seen, all the components from the different path exist yet the relative signal strengths among the components have changed.

Figure 4C:
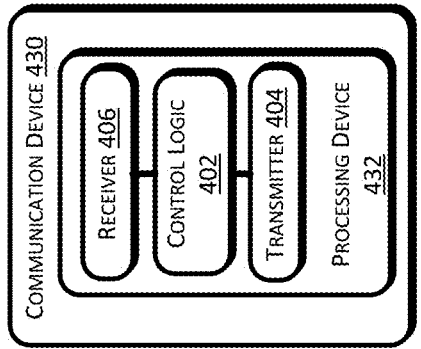
FIG. 4C is a block diagram illustrating another example of communication devices implementing transmitter precoding for optimizing positioning performance in accordance with the present disclosure.
Figure 4B:
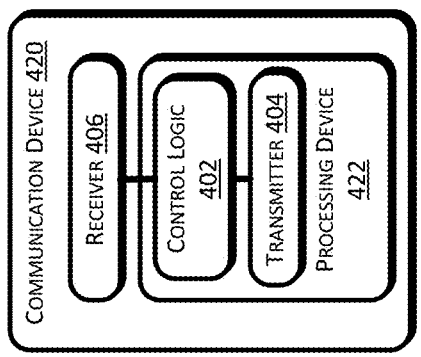
FIG. 4B is a block diagram illustrating another example of communication devices implementing transmitter precoding for optimizing positioning performance in accordance with the present disclosure.
Figure 4A:
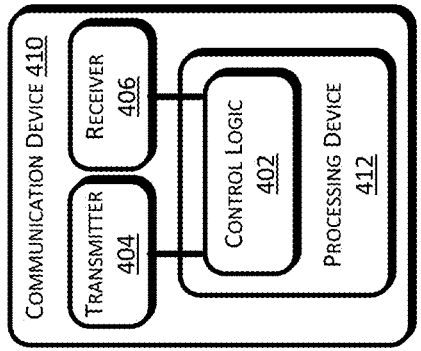
FIG. 4A is a block diagram illustrating example communication devices implementing transmitter precoding for optimizing positioning performance in accordance with the present disclosure.

FIG. 4 illustrates an example scheme 400 that implements the techniques of transmitter precoding of the present disclosure. In the scheme 400, a first communication device 410 transmits signals to a second communication device 420. The first communication device 410 may include transmitter functionality without receiver functionality or, alternatively, the first communication device 410 may include both transmitter functionality and receiver functionality, e.g., a transponder or transceiver. Likewise, the second communication device 420 may include receiver functionality without transmitter functionality or, alternatively, the second communication device 420 may include both transmitter functionality and receiver functionality, e.g., a transponder or transceiver.

As shown in FIG. 4, the first communication device 410, acting as a transmitter, transmits a plurality of preambles 430a-n at different times, signal strengths and phases in a plurality of directions. Each preamble is transmitted in a corresponding one of the directions. For example, the first communication device 410 transmits the plurality of preambles 430a-n with different precoding for each. The second communication device 420, acting as a receiver, will receive multipath components of some or all of the transmitted preambles 430a-n due to different reflections and refractions caused by structures, walls and obstacles in the surrounding. More specifically, as some or all of the transmitted preambles 430a-n are reelected and/or refracted, the multi path components of each preamble received by the second communication device 420 may arrive at the second communication device 420 at different times and at different signal strengths. Based on the received components of some or all of the transmitted preambles 430a-n, the second communication device analyzes the channel for each preamble and estimates the ToA of the LoS component of each received preamble. In particular, the second communication device 420 may choose the best estimation of the earliest ToA, from among the estimated ToAs, to determine the LoS distance between itself and the first communication device 410. Subsequently, the second communication device 420 can determine the LoS direction (and LoS distance) between itself and the first communication device 410.

Optionally, after the second communication device 420 determines the channel, it may inform the first communication device 410 of such information, e.g., by transmitting a feedback data packet to the first communication device 410. Based on this information, the first communication device 410 may perform beam forming/precoding to optimize the ToA measurement. More specifically, the first communication device 410 may use the channel information and solve an optimization problem that, for example, enhances the LoS component This precoding scheme is applied to the transmitted signal and maximizes the quality of the LoS component.

In some embodiments, the first communication device 410 first transmits a plurality of sounding preambles of a data packet then transmits a payload portion of the data packet after transmitting the plurality of sounding preambles. For example, some or all of the signals transmitted at the directions 430a-n may be sounding preambles of a data packet Upon receiving these sounding preambles, the second communication device 420 may better estimate the ToA and thereby more accurately determine the distance between the first communication device 410 and the second communication device 420.

With respect to the second communication device 420, it may receive the plurality of preambles from the plurality of directions 430a-n and estimate a respective channel, or path, for each of the received preambles. From there, the second communication device 420 may estimate the ToA based on one or more of the received preambles, including the LoS preambles transmitted in the LoS direction 430a fh.m1 communication device 410. The second communication device 420 may then determine the LoS distance between its receiver and the transmitter of the first communication device 410 using the estimated ToA. Likewise, in an event that the first communication device 410 also includes a receiver, the first communication device 410 may receive a feedback signal from the second communication device 420 that indicates the channel state information. Moreover, the first communication device 410 may receive the channel state information, and according to it transmit a preamble to the second communication device 420 which is optimized for LoS component extraction and timing estimation.

Figure 5:
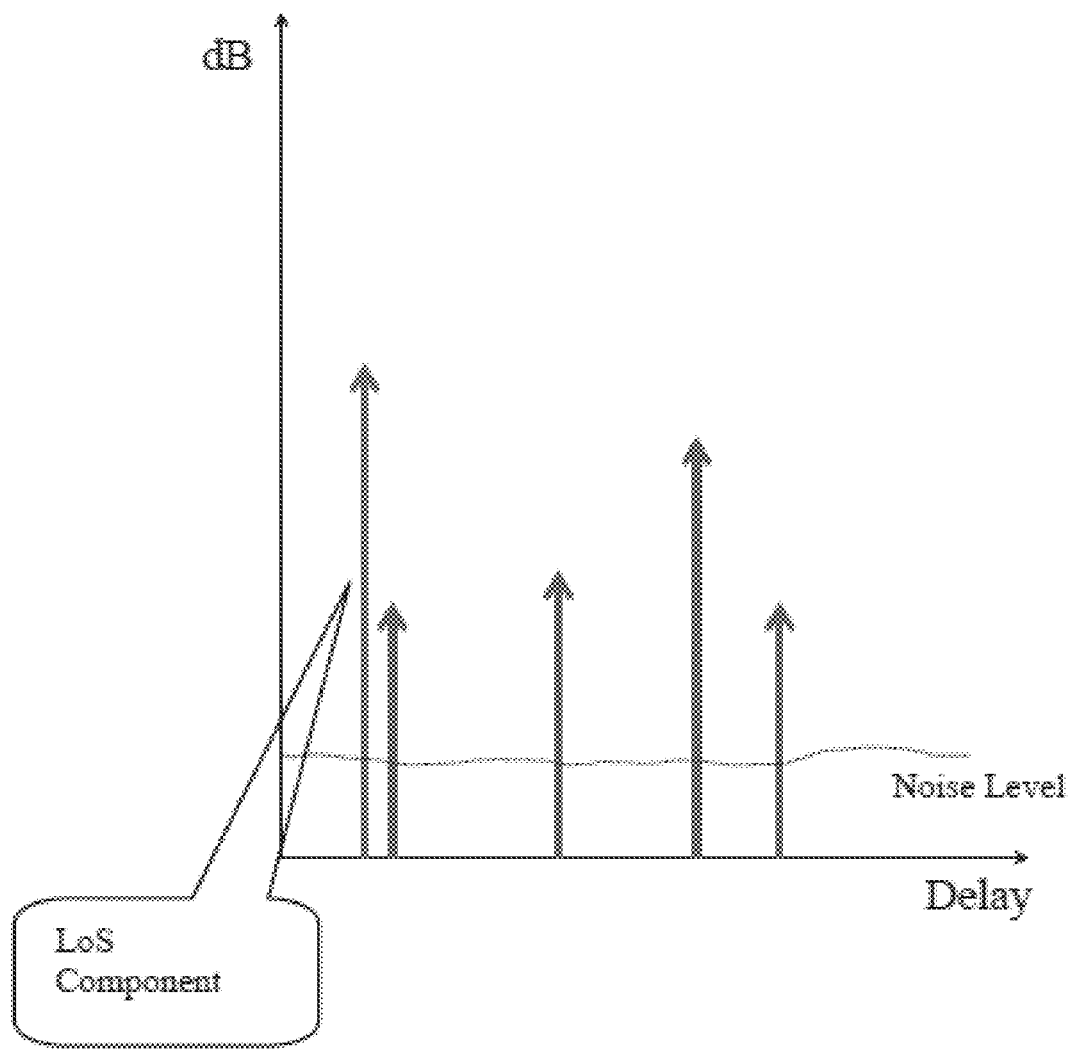
FIG. 5 is a diagram illustrating an example scenario of signal strengths of various channels at a receiver with transmitter precoding for optimizing positioning performance in accordance with the present disclosure.

FIG. 5 illustrates an example scenario of a channel received by a receiver with transmitter precoding for optimizing positioning performance in accordance with the present disclosure. The LoS component is stronger than the case without precoding relative to the other components, and is not necessarily the highest.

Example Communication Devices

Figure 6:
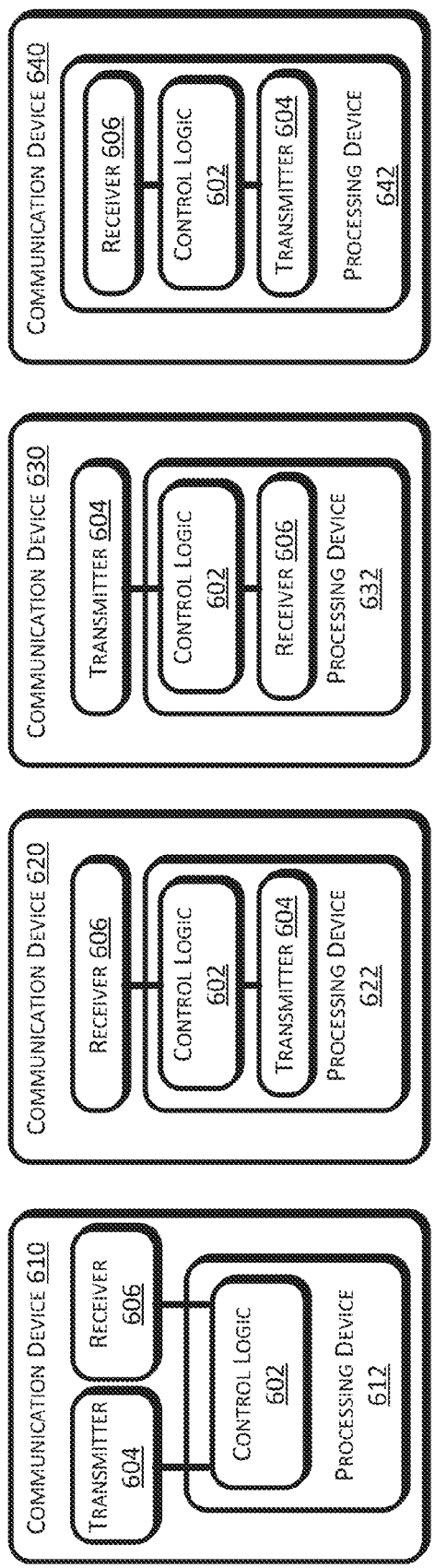
FIG. 6 is a block diagram illustrating example communication devices implementing transmitter precoding for optimizing positioning performance in accordance with the present disclosure.

FIG. 6 illustrates example communication devices 610, 620, 630 and 640 in which techniques of transmitter precoding for optimizing positioning performance in accordance with the present disclosure are implemented. Each of the example communication devices 610, 620, 630 and 640 may he an implementation of any, some or all of the transmitter 210, the receiver 220, the communication device 410, and the communication device 420. AS shown in FIG. 6, in configuration (A), a communication device 610 includes a processing device 612 having control logic 602. The communication device 610 also includes a transmitter 604 and a receiver 606. The processing device 612 may be implemented as an integrated circuit (IC), or chip, a chipset having more than one chips, or a printed circuit board (PCB). The control logic 602 may take the form of hardware, middleware, firmware or software, or a combination thereof. For example, the control logic 602 may be implemented as part of the circuitry of the processing device 612. In configuration (A), the transmitter 604, and the receiver 606 are separate from the processing device 612. Although FIG. 6 shows the transmitter 604 and the receiver 606 as discrete components separate from one another, in some embodiments, the transmitter 604 and the receiver 606 may be implemented as integral parts of a transceiver.

In configuration (B), a communication device 620 includes a processing device 622 having the control logic 602 and the transmitter 604. The communication device 620 also includes the receiver 606. The processing device 622 may be implemented as a chip, a chipset having more than one chips, or a PCR The control logic 602 and the transmitter 604 may each take the form of hardware, middleware, firmware or software, or a combination thereof. For example, the control logic 602 may be implemented as part of the circuitry of the processing device 622. In configuration (B), the receiver 606 is separate from the processing device 622.

In configuration (C), a communication device 630 includes a processing device 632 having the control logic 602 and the receiver 606. The communication device 630 also includes the transmitter 604. The processing device 632 may be implemented as a chip, a chipset having more than one chip, or a PCR The control logic 602 and the transmitter 604 may each take the form of hardware, middleware, firmware or software, or a combination thereof. For example, the control logic 602 may be implemented as part of the circuitry of the processing device 632. In configuration (B), the receiver 606 is separate from the processing device 632. in configuration (D), a communication device 640 includes a processing device 642 having the control logic 602, the transmitter 604 and the receiver 606. The processing device 642 may be implemented as a chip, a chipset having more than one chips, or a PCB. The control logic 602, the transmitter 604 and the receiver 606 may each take the form of hardware, middleware, firmware or software, or a combination thereof For example, the control logic 602, the transmitter 604 and the receiver 606 may each be implemented as part of the circuitry of the processing device 642.

Regardless of the configuration, the control logic 602 may direct the transmitter 604 to transmit a plurality of preambles in a plurality of directions with different precoding for each transmission, as described above. The control logic 602 may, based on given channel state information, direct the transmitter 604 to transmit a preamble with precoding so that the preamble is transmitted in such a way that is optimized for LoS component extraction and timing estimation on the receiver end. The control logic 602 may also direct the receiver 606 to receive a plurality of preambles in the form of multipath components for each preamble. The control logic 602 may analyze the channel for each preamble and estimate the ToA of the LoS component to choose the best estimation of the earliest ToA to determine the LoS distance between the receiver 606 and a transmitter of the plurality of preambles.

In some embodiments, the plurality of signals may be a plurality of sounding preambles of a data packet The control logic 602 may direct the transmitter 604 to transmit a payload portion of the data packet after transmitting the plurality of sounding preambles.

Although a set number of various configurations are shown in FIG. 6, it would be appreciated by those of ordinary skill in the art that communication devices of alternative configurations might be available in which techniques of transmitter precoding for optimizing positioning performance in accordance with the present disclosure are implemented. In other words, in terms of implementation in communication devices the scope of the present disclosure is not limited to that illustrated in FIG. 6. Any variation thereof and any possible configuration would be deemed to be covered by the scope of the present disclosure.

Example Processes

Figure 7:
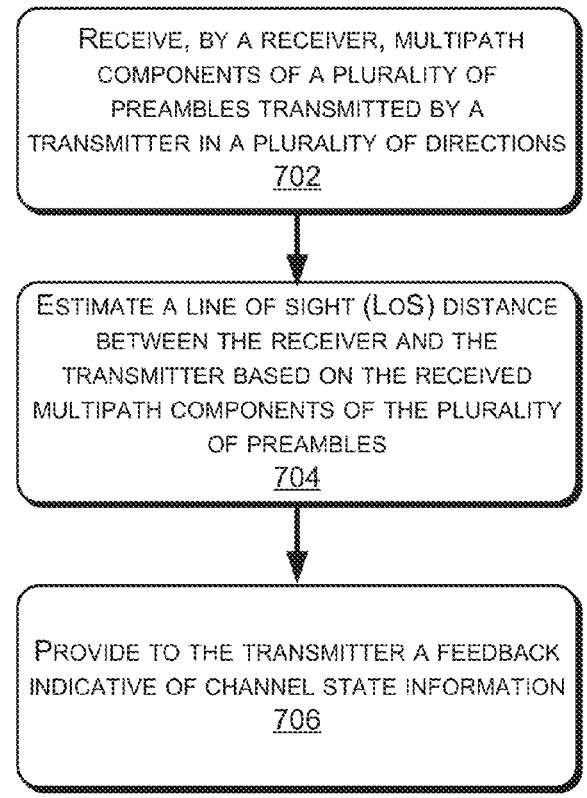
FIG. 7 is a flow chart illustrating an example method for transmitter precoding for optimizing positioning performance in accordance with the present disclosure.
Figure 8:
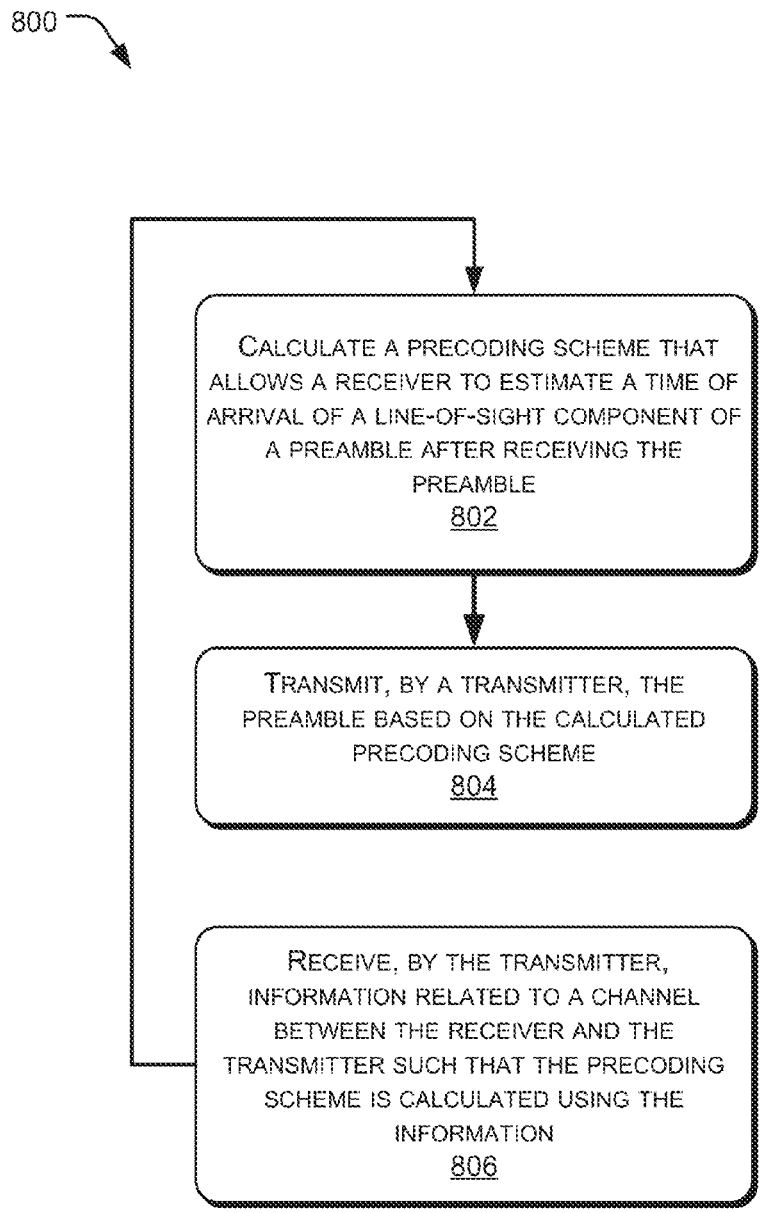
FIG. 8 is a flow chart illustrating another example method for transmitter precoding for optimizing positioning performance in accordance with the present disclosure.

FIGS. 7 and 8 are flow diagrams illustrating example processes 700 and 800 that implement techniques of transmitter precoding for optimizing positioning performance. The order in which the process operations of example processes 700 and 800 is described is not intended to be construed as a limitation, and any number of the described process operations may be combined in any order to implement the process, or alternate process. Additionally, individual operations may be deleted from the process without departing from the spirit and scope of the subject matter described herein. Furthermore, the processes may be implemented in any suitable hardware, software, firmware, or a combination thereof, without departing from the scope of the present disclosure.

Each of the processes 700 and 800 may be performed, at least in part, by the transmitter 210, the receiver 220, the communication device 410, the communication device 420, the control logic 602, the processing device 612, the processing device 622, the processing device 632, the communication device 610, the communication device 620 or the communication device 630 as described above.

As shown in FIG. 7, the process 700 begins with operation 702, in which a receiver receives a plurality of multi path components of a plurality of preambles that are transmitted by a transmitter in a plurality of directions. For example, the receiver 220 may receive multipath components of preamble A and preamble B that are transmitted by the transmitter 210 in a number of directions, including direction 1 and direction 2 as shown in FIG. 2.

At operation 704, the receiver estimates a line of sight (LoS) distance between the receiver and the transmitter based on the received plurality of multipath components of the plurality of preambles. For example, the receiver 220 may estimate the LoS distance between the receiver 220 and the transmitter 210 based on the received multi path components of preamble A and preamble B.

In some embodiments, the receiver estimates the LoS distance between the receiver and the transmitter by identifying a earliest time of arrival (ToA) of the plurality of multipath components of the plurality of preambles to estimate the LoS distance. For example, the receiver 220 may identify the earliest ToA of the multi path components of preamble A and preamble B to estimate the LoS distance between the receiver 220 and the transmitter 210.

In some embodiments, the receiver estimates the LoS distance between the receiver and the transmitter by (1) estimating a respective channel for each of the plurality of preambles, (2) estimating a respective time of arrival (ToA) with respect to one or more of the estimated channels, (3) calculating a respective score for each estimated ToA, (4) identifying a best estimated ToA from among the estimated ToAs of the plurality of preambles, the best estimated To A having a respective score higher than that of other estimated To As, and (5) calculating the LoS distance based on the earliest ToA. For example, the receiver 220 may estimate the channel for each of preamble A and preamble B For each estimated channel, the receiver 220 may estimate the respective ToA. For each estimated ToA, the receiver 220 may calculate a respective score. Based on the scores of the estimated ToAs of the components of preamble A and preamble B, the receiver 220 may identify that preamble A has the earliest ToA or the strongest signal strength for its LoS component, or both, since preamble A was transmitted approximately along the line of sight between the transmitter 210 and the receiver 220. The receiver 220 may then calculate the LoS distance between the receiver 220 and the transmitter 210 based on the earliest ToA, for example, by multiplying the earliest ToA and the speed of light.

The process 700 may optionally include additional operations, such as operation 706. At operation 706, a feedback is provided to the transmitter by the receiver. The feedback indicates channel state information that is based on at least one of the plurality of preambles. For example, once the receiver 220 receives either or both of preamble A and preamble B, the receiver 220 may analyze the channel based on at least one of preamble A and preamble B, and provide a feedback, e.g., by transmitting a message, to the transmitter 210 to indicate channel state information of the channel.

In some embodiments, the plurality of preambles may comprise a plurality of preambles of a data packet. In such case, a payload portion of the data packet may be transmitted after the preambles are transmitted. For example, referring to FIG. 4, after the communication device 410 transmits a plurality of preambles 430a-n of a data packet in the directions, the communication device 410 may transmit the payload of the data packet.

In some embodiments, the plurality of preambles are transmitted by the transmitter in a plurality of phases at a plurality of different times. For example, the transmitter may transmit the plurality of preambles with different precoding for each transmission.

In some embodiments, one or more of the plurality of multipath components of the plurality of preambles are received by the receiver due to reflection or refraction.

As shown in FIG. 8, the operation 800 begins with operation 802, where a precoding scheme is calculated. The precoding scheme allows a receiver to estimate the ToA of the LoS component of a preamble after receiving the preamble. For example, as part of the communication device 410, the communication device 420, or the first communication device 610, the control logic 602 may calculate such precoding scheme.

At operation 804, the preamble is transmitted by a transmitter based on the calculated precoding scheme. For example, the control logic 602 may direct the transmitter 604 to transmit the preamble based on the calculated precoding scheme.

In some embodiments, the precoding scheme results in the LoS component of the preamble arriving at the receiver with a signal strength stronger than signal strengths of non-LoS components of the preamble.

In some embodiments, the precoding scheme comprises beam forming.

Optionally, the process 800 may further comprise operation 806. At operation 806, the transmitter receives information related to a channel between the receiver and the transmitter such that the precoding scheme is calculated using the information related to the channel. For example, prior to calculating the precoding scheme, the first communication device 410 may receive feedback from the second communication device 420. The feedback may include channel state information about a channel between the second communication device 420 and the first communication device 410. Based on the channel state information, the first communication device 410 may then calculate an optimal precoding scheme that allows the second communication device 420 to estimate the ToA of the LoS component of a preamble after receiving the preamble.

Example Computing Device

Figure 9:
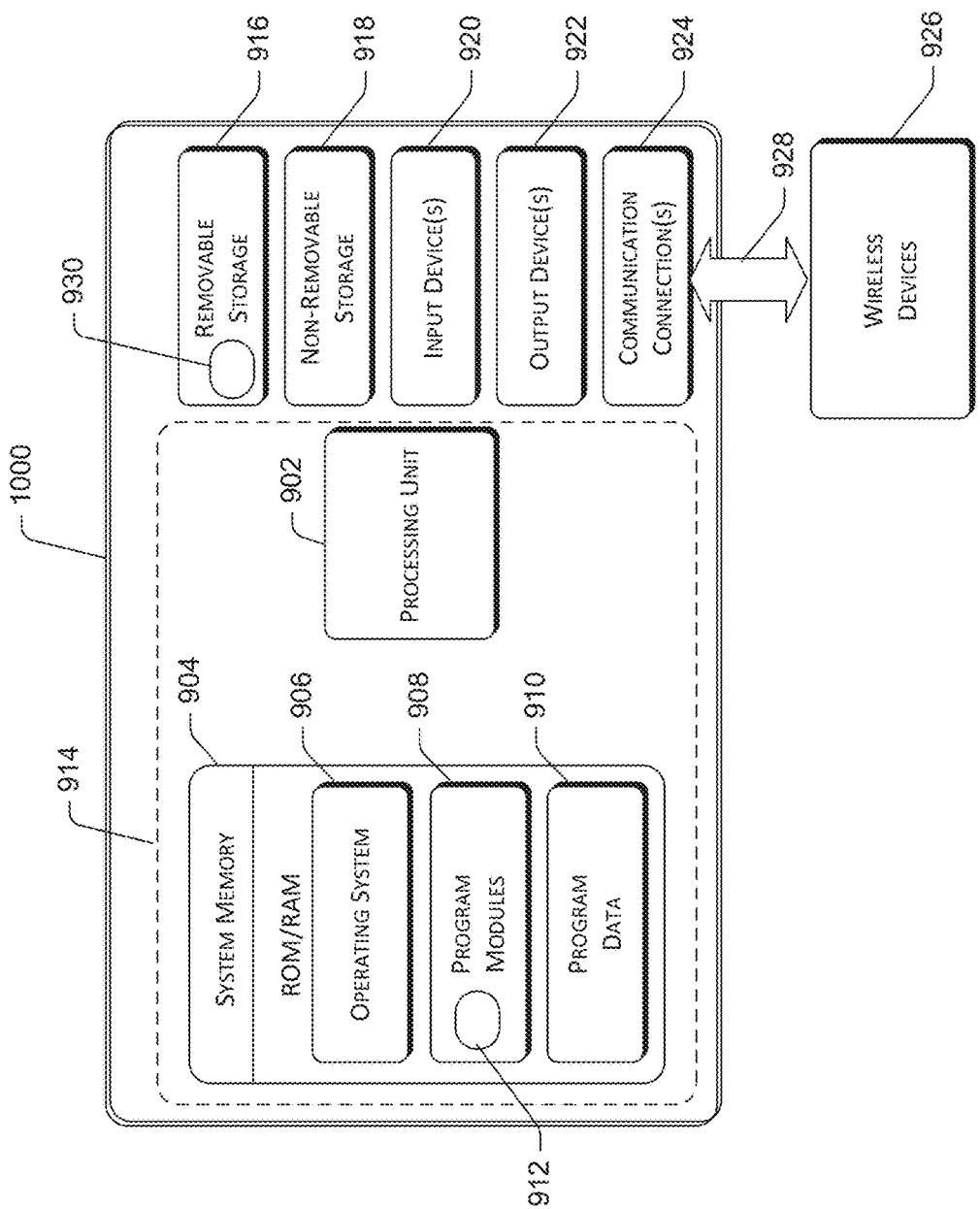
FIG. 9 is a block diagram illustrating an example computing device that implements transmitter precoding for optimizing positioning performance in accordance with the present disclosure.

FIG. 9 illustrates an example computing device 900 that implements the scheme of transmitter precoding for optimizing positioning performance. However, it will be readily appreciated that the techniques disclosed herein may be implemented in other computing devices, systems, and environments. The computing device 900 shown in FIG. 9 is one example of a computing device and is not intended to suggest any limitation as to the scope of use or functionality of the computer and network architectures.

In at least one implementation, computing device 900 typically includes at least one processing unit 902 and system memory 904. Depending on the exact configuration and type of computing device, system memory 904 may be volatile (such as RAM), non-volatile (such as ROM, flash memory, etc.) or some combination thereof System memory 904 may include an operating system 906, one or more program modules 908, and may include program data 910. A basic implementation of the computing device 900 is demarcated by a dashed line 914.

The program module 908 may include a module 912 configured to implement the one-tap connection and synchronization scheme as described above. For example, the module 912 may carry out one or more of the scheme 100, method 700 and method 800, and variations thereof, e.g., the computing device 900 acting as described above with respect to the control logic 602, processing device 612, processing device 622, processing device 632, processing device 642, communication device 610, communication device 620, communication device 630, or communication device 640.

Computing device 900 may have additional features or functionality. For example, computing device 900 may also include additional data storage devices such as removable storage 916 and non-removable storage 918. In certain implementations, the removable storage 916 and non-removable storage 918 are an example of computer accessible media for storing instructions that are executable by the processing unit 902 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., processing device 612, processing device 622, processing device 632, processing device 642, communication device 610, communication device 620, communication device 630, or communication device 640. Any of such computer accessible media may be part of the computing device 900.

In one implementation, the removable storage 916, which is a computer accessible medium, has a set of instructions 930 stored thereon. When executed by the processing unit 902, the set of instructions 930 cause the processing unit 902 to execute operations, tasks, functions and/or methods as described above, including scheme 100, method 700, method 800, and any variations thereof.

Computing device 900 may also include one or more input devices 920 such as a keyboard, mouse, pen, voice input device, touch input device, etc. Computing device 900 may additionally include one or more output devices 922 such as a display, speakers, printer, etc.

Computing device 900 may also include one or more communication connections 924 that allow the computing device 900 to communicate wirelessly with one or more other wireless devices, over wireless connection 928 based on near field communication (NFC), Wi-Fi, Bluetooth, radio frequency (RF), infrared, or a combination thereof.

It is appreciated that the illustrated computing device 900 is one example of a suitable device and is not intended to suggest any limitation as to the scope of use or functionality of the various embodiments described.

Additional and Alternative Implementation Notes

Various embodiments of techniques that implement transmitter precoding for optimizing positioning performance are provided herein. Multiple signals are transmitted from a transmitter with independent and appropriate signal strengths such that the ToA, and hence the LoS distance between the transmitter and a receiver, may be estimated accurately. It shall be appreciated by those of ordinary skill in the art that, although certain precoding techniques are described herein, there may be other precoding techniques that may improve the LoS identification and enable better timing measurement. Beam forming may be one of such techniques, for example, in that the same signal may be transmitted from different antennas but with different phases.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A device comprising:
   at least one receiver;
   at least one memory storing computer-executable instructions; and
   at least one processor configured to access the at least one memory, wherein the at least one processor is configured to execute the computer-executable instructions to:
   identify a first preamble received by the at least one receiver from a first device at a first direction;
   identify, a second preamble received by the at least on receiver from the first device at a second direction;
   determine a first signal characteristic associated with the first preamble;
   determine a second signal characteristic associated with the second preamble;
   determine that the first signal characteristic is greater than the second signal characteristic;
   determine an estimate of a first channel at the first direction based at least in part on the first signal characteristic being greater than the second signal characteristic; and
   identify a payload, received in the first direction from the first device, by the at least one receiver.

2. The device of claim 1, further comprising at least one transmitter coupled to the at least one transceiver.

3. The device of claim 1, wherein the at least one processor is further configured to execute computer-executable instructions to:
   compare the first signal characteristic and the second signal characteristic; and
   select the first direction when the first signal characteristic is greater than the second signal characteristic.

4. The device of claim 3, wherein the at least one processor is further configured to execute computer-executable instructions to:
   determine a line of sight between the device and the first device based at least in part on the second signal characteristic
   determine an estimate of a second channel associated with the first device based at least in part on the second signal characteristic.

5. The device of claim 4, wherein the at least one processor is further configured to execute the computer-executable instructions to:
   determine the estimate of the second channel is based at least in part on a first time of arrival of the first preamble and a second time of arrival of the second preamble.

6. The device of claim 4, wherein the estimate of the second channel associated with the first device is based at least in part on the line of sight between the device and the first device.

7. The device of claim 5, wherein the at least one processor is further configured to execute the computer-executable instructions to:
   determine the estimate of the second channel is based at least in part on the first time of arrival is greater than the second time of arrival.

8. The device of claim 1, wherein the first signal characteristic is a first signal strength associated with the first preamble and the second signal characteristic is a second signal strength associated with the second preamble.

9. A non-transitory computer-readable medium storing computer executable instructions which, when executed by a processor, cause the processor to perform operations comprising:
   determining a first direction to transmit a first preamble to a first device;
   determining a first signal characteristic associated with the first direction;
   determining a second direction to transmit a second preamble to the first device;
   determining a second signal characteristic associated with the first direction, wherein the first signal characteristic is greater than the second signal characteristic; and
   causing to send:
   the first preamble and a payload, in the first direction at a first transmission power level, to the first device, and
   the second preamble and the payload, in the second direction at a second transmission level, to the first device.

10. The non-transitory computer-readable medium of claim 9, wherein the second direction is a first angular distance from the first direction.

11. The non-transitory computer-readable medium of claim 9, further comprising operations of:
   determining the first level of transmission power associated with the first direction; and
   determining the second level of transmission power associated with the second direction.

12. A method comprising:
   identifying, a first preamble from a first device at a first direction;
   identifying, a second preamble from the first device at a second direction;
   determining, by the one or more processors, a first signal characteristic associated with the first preamble;
   determining, by the one or more processors, a second signal characteristic associated with the second preamble;
   determining that the first signal characteristic is greater than the second signal characteristic;
   determining an estimate of a first channel at the first direction based at least in part on the first signal characteristic being greater than the second signal characteristic; and
   identifying a payload, received in the first direction from the first device, by the at least one receiver.

13. The method of claim 12, further comprising:
   comparing the first signal characteristic and the second signal characteristic;
   selecting the first direction when the first signal characteristic is greater than the second signal characteristic.

14. The method of claim 13, further comprising determining an estimate of a second channel associated with the first device based at least in part on the second signal characteristic.

15. The method of claim 14, wherein the first signal characteristic is a first signal strength associated with the first preamble and the second signal characteristic is a second signal strength associated with the second preamble.

16. The method of claim 14, wherein the estimate of the second channel associated with the first device is based at least in part on the line of sight between the first device and the second device.

17. The method of claim 14, wherein the estimate of the second channel associated with the first device is based at least in part on the line of sight between the first device and the second device.

18. The method of claim 14, wherein a first time of arrival of the first preamble is greater than a second time of arrival of the second preamble.

19. The method of claim 12, further comprising determining a line of sight between the first device and a second device based at least in part on the second signal characteristic.

* * * * *